UNITED STATES PATENT OFFICE 2,609,070

DOUBLE TOGGLE GASKET

Walter C. Frehse, Wabash, Ind., assignor to The General Tire and Rubber Company, Akron, Ohio, a corporation of Ohio Application July 25, 1950, Serial No. 175,691

3 Claims. (Cl. 189—78)

This invention relates to improvements in flexible seals for glazing and sealing two panels together and, in particular, it relates to improvements in seals utilizing the toggle linkage as the spreading and clamping means.

Gaskets or seals utilizing the toggle linkage as the expanding means are more fully explained in the copending application of Beck, Serial No. 119,852 assigned to the same assignee as this invention is. Generally, a toggle seal is characterized by two oppositely disposed panel edge-receiving grooves with a longitudinal hollow or opening intermediate them and a toggle linkage expanding means integral with the seal body for fitting into said longitudinal opening and expanding the seal body into tight fitting engagement with the panel edges in the panel edge receiving grooves. The toggle linkage comprises a pair of interfitting linear strips hinged and pivotal together at their juncture along the center line of the hollow with one or both toggle strips and also being hinged and integral with the seal or mounting body along the hollow edges. Thus a triangular linkage is created with the apex at the juncture of the two toggle strips and the base along the top of the hollow with pivot points along both hollow edges. As this toggle strip is closed, considerable leverage develops and spreads the edges of the hollow apart and the mounting body into tight gripping engagement with the panel edges in the panel edge-receiving grooves. The toggle linkage is preferably pushed down to or past the dead center position and thus locks itself in place.

The object of the present invention is to provide an improved toggle linkage which gives greater spreading action or motion while occupying the same space as the present toggle arrangement.

Another object of the present invention is to produce a toggle linkage which makes maximum use of the space allotted it.

Another object of the present invention is to provide a toggle linkage with an interfitting key which will lock and hold the toggle in the longitudinal hollow.

Other objects and advantages will be apparent from the following description of the invention as illustrated by the accompanying drawings, in which.

Figure 1:
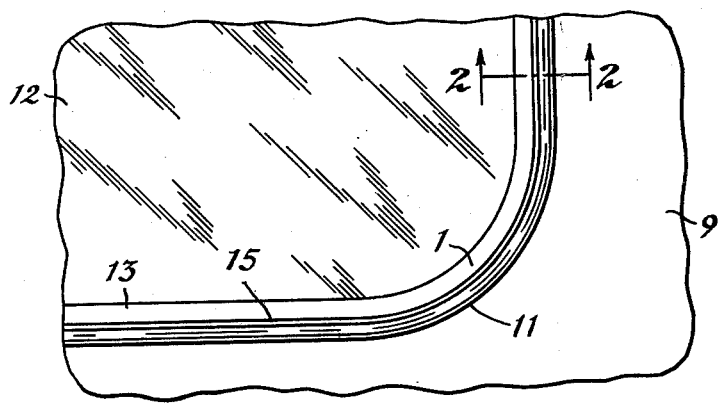
Figure 1 is a front elevation of a seal utilizing the toggle linkage of this invention as assembled with an automobile windshield.
Figure 2:
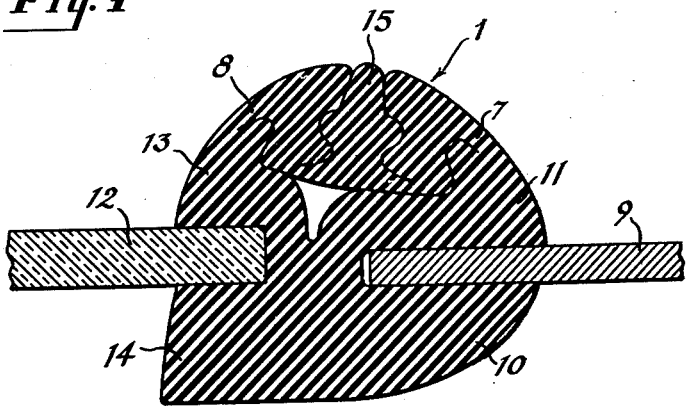
Fig. 2 is a cross-sectional view taken along line 2—2 in Fig. 1 and showing the toggle linkage of the present invention as assembled with two panel edges.
Figure 3:
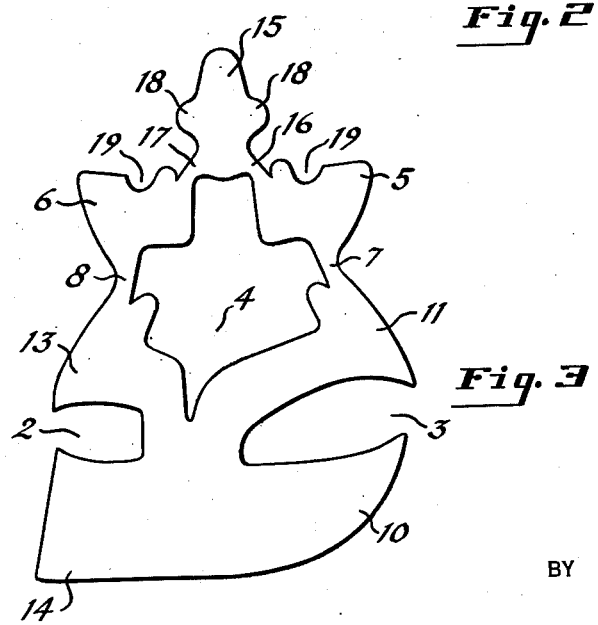
Fig. 3 is a cross-sectional view of the seal of the present invention as extruded or in the natural state.

Referring more particularly to the drawings, wherein like parts are indicated by like numerals of reference throughout, it is seen that the linear seal or mounting of the present invention exerts strong locking pressure and sealing pressure obtained by the toggle linkage on the side edges of the panels to be joined. The seals or mountings are made from rubberlike material and have a substantially uniform cross-section.

The mounting 1 is characterized by two oppositely disposed grooves 2 and 3 with a longitudinal hollow 4 intermediate them and on one side of a plane bisecting the ends of the grooves.

The groove 3 which receives the edge of the automobile body panel 9 is formed by mounting body flanges 10 and 11, and the groove 4 which receives the edge of the window glass 12 is formed by mounting body flanges 13 and 14. Each flange face fitting with the panel edges is concavely curved as shown, to grip and seal the panel with which it fits.

Hinged and pivotal with one outer edge of the hollow or opening 4 is linear toggle element 5, and likewise hinged and pivotal with the other outer or opposite outer edge of the hollow is toggle element 6. These toggle elements are longitudinally flexible and laterally stiff. Toggle element or linear toggle member 5 pivots around pivot or hinge line 7 which is along the edge of the hollow 4 at the junction of toggle member 5 with body flange 11 and toggle element or linear toggle member 6 pivots around pivot or hinge line 8 which likewise is along the opposite edge of hollow 4 at the junction of toggle member 6 with body flange 13. Intermediate the two toggle members is the spacing element 15 which is hinged to and pivots with toggle element 5 along one base edge and is hinged to and pivots with toggle element 6 along the other base edge. Thus the spacing element or intermediate keying piece 15 pivots with toggle member 5 at pivot point 16 and with toggle member 6 at pivot point 17. The spacing element or intermediate spacing section itself has a relatively broad base and truncated outer portion which has oppositely disposed beads or ribs 18 which interfit and key with grooves or channels 19 in the toggle members. The spacing or keying piece is longitudinally flexible but laterally stiff so that all hinging and pivoting action takes place around the pivot points 16 and 17. It acts both as a spacing element to provide two outer pivots for the toggle elements and as a locking or keying piece to keep the toggle assembly together once it has been closed.

The spacing element may have any cross-sectional shape which gives longitudinal flexibility and lateral stability. The keying beads and truncated portion are not necessary components but, of course, are very advantageous.

The advantage of applicant's toggle linkage as applied to mountings is now apparent. By providing the spacing or keying member 15 intermediate the toggle members 5 and 6, applicant greatly improves the toggle linkage. Instead of a single pivot point between the toggle elements in which case the toggle derives its spreading or expanding action only from the radii lengths from the hinges or pivot points along the longitudinal hollow up to the central pivot so that the maximum spread is the length of these two radii, the present invention has two outer pivot points on the spacing member and has a maximum spread equal to two radii lengths from the hollow edge pivot point to the spacing member pivots. Thus the effectiveness of the toggle linkage is greatly increased by the width of the spacing member and the mounting can apply an even tighter and firmer grip on the panel edges.

A still further advantage to the present invention is the fact that the spacing member acts as a key which interfits with the toggle elements and locks them together. This makes it difficult to open the toggle without a special pry and prevents the assembly from opening under constant jarring or vibratory conditions.

The present invention is particularly applicable to smaller sized toggle seals in which a more effective spreading means is required. It can be used for joining any two panels or sheets together. In the drawings it has been shown joining an automobile glass with the automobile body, but it is by no means limited to this purpose.

What I claim is:

1. A flexible linear seal of rubberlike material for joining two panel edges together, said seal having a body of uniform cross-section with two spaced grooves disposed therein, and a longitudinal opening in said body portion between two of said grooves and disposed generally on one side of a longitudinal plane passing through the midpoints of the base of said grooves and expanding means comprising two toggle elements and an intermediate keying piece, each of said toggle elements being hinged to said body portion along said longitudinal opening on one edge and to the intermediate keying piece on the other edge, said opening and said toggle elements and keying piece being proportioned so that said opening tightly receives said toggle elements and keying piece when the side walls of said panel edge-receiving grooves are spaced sufficiently to receive suitable panel edges, whereby the rubberlike material of said body closely adjacent the edges of the panel edge-receiving grooves is compressed against the portions of a panel in said grooves and said toggle elements are maintained in said opening by the body of the seal pressing upon them.

2. A flexible linear seal of rubberlike material for joining adjacent edges of rigid panel like structures together, said seal having a body portion of uniform cross-section with two spaced and generally opposite linear grooves therein, a hollow in said body between said grooves and filler means comprising linear toggle members and a spacing member, each of said toggle members being hinged on one corner to said body along each edge of said hollow and along the opposite corner to the intermediate spacing member, said toggle members and intermediate spacing member being proportioned so that said toggle elements can both be pressed together and sprung into said hollow to thereby compress portions of the body of the seal around edge portions of panels in said grooves to hold said edge portions firmly therein and to cause said toggle elements to be held and locked in said hollow by resulting pressure exerted from the body of the seal pressing upon them.

3. A flexible linear seal of the rubberlike material for joining adjacent edges of rigid panel like structures together having a body portion of uniform cross-section with two spaced and generally opposite linear grooves therein, a hollow in said body between said grooves and toggle expanding assembly comprising a toggle section of rubberlike material pivotal along one edge portion of said hollow, a second toggle section of rubberlike material pivotal along the opposite edge portion of said hollow, and an intermediate spacing section pivotal along one edge with said first toggle section and along the opposite edge with said second toggle section, all of said sections being of sufficient thickness to be transversely resistant to bending and folding, said intermediate spacing section having a relatively broad base and triangular outer portions with beaded extensions along each side which interfit and key with grooves in said toggle sections, said toggle sections, intermediate spacing section, and said hollow, being so proportioned that said toggle sections and intermediate spreader and keying section can be pressed together and sprung into said hollow to thereby compress portions of the body of the seal around edge portions of panels in said grooves to hold said edge portions firmly therein and to cause said toggle expanding assembly to be held and locked in said hollow by resulting pressure exerted from the body of the seal pressing upon them.

WALTER C. FREHSE.

REFERENCES CITED

The following references are of record in the file of this patent:

UNITED STATES PATENTS

| Number | Name | Date |
|---|---|---|
| 2,189,138 | Eichner | Feb. 6, 1940 |
| 2,288,329 | Smith | June 30, 1942 |
| 2,492,566 | Geyer | Dec. 27, 1949 |